Dec. 16, 1924.
A. M. LOFLAND
METAL WHEEL
Filed Feb. 26, 1921
1,519,496
2 Sheets-Sheet 1
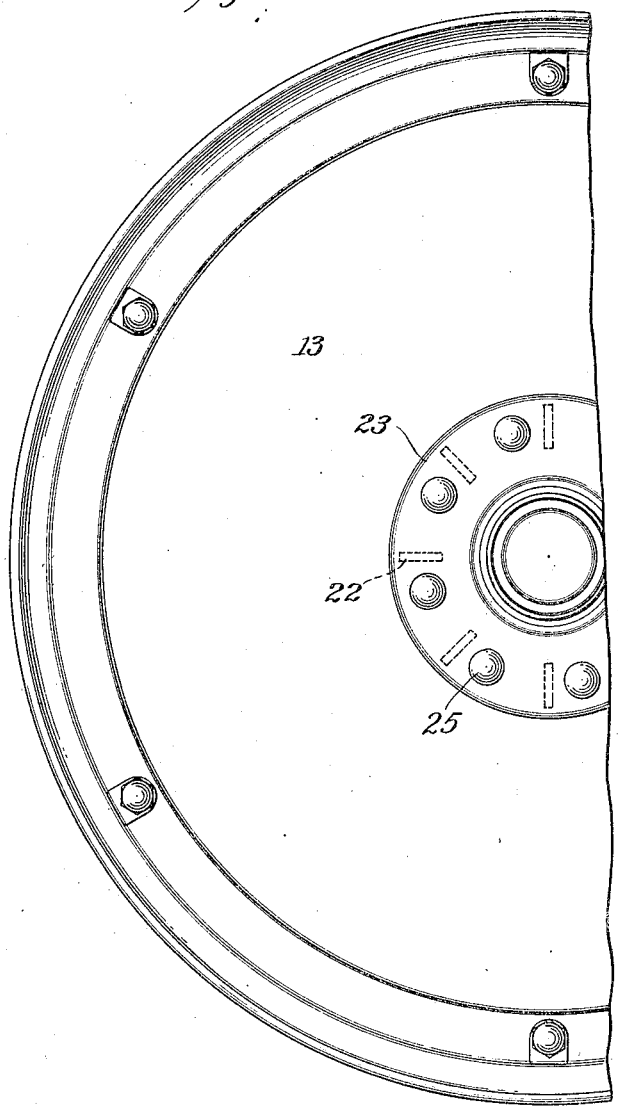
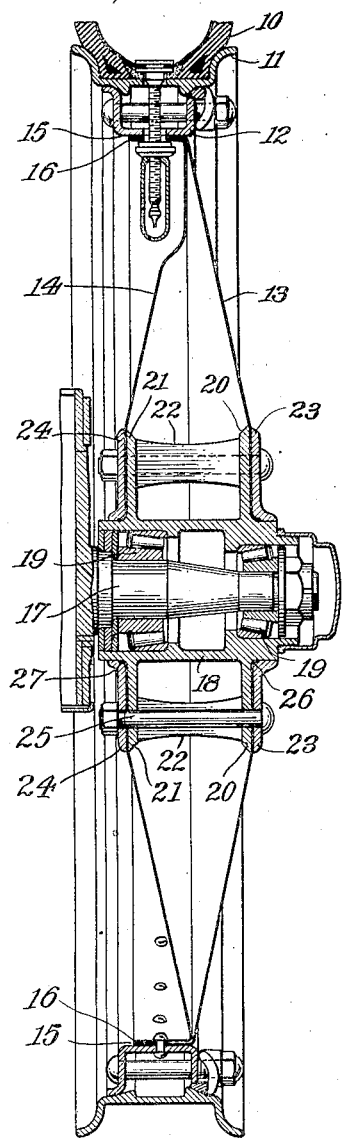
Fig. 2
Fig. 1
Inventor
Alfred M. Lofland
By his Attorney
Wm Dohleber

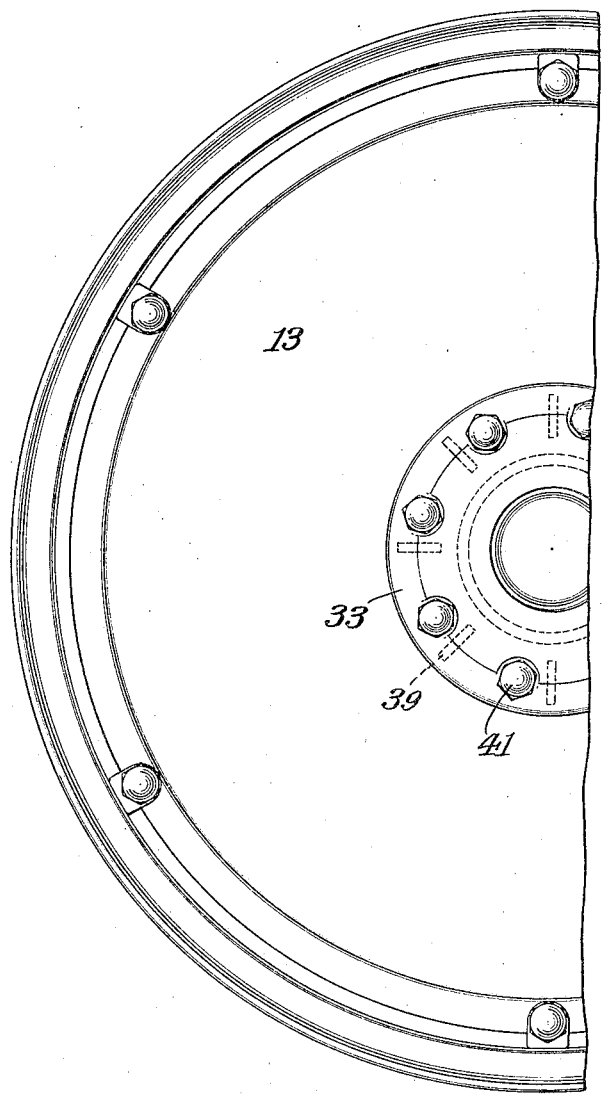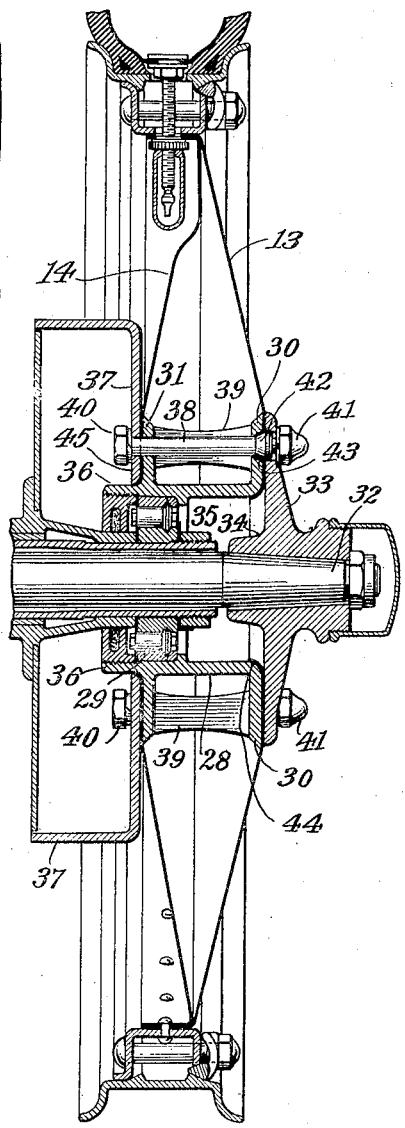

Patented Dec. 16, 1924.

1,519,496

UNITED STATES PATENT OFFICE.

ALFRED M. LOFLAND, OF LEBANON, INDIANA, ASSIGNOR OF ONE-HALF TO LEWIS C. WILLIS, OF INDIANAPOLIS, INDIANA.

METAL WHEEL.

Application filed February 26, 1921. Serial No. 448,067.

*To all whom it may concern:*

Be it known that I, ALFRED M. LOFLAND, a citizen of the United States, residing at Lebanon, in the county of Boone and State of Indiana, have invented certain new and useful Improvements in Metal Wheels, of which the following is a full, clear, and exact description.

The invention which constitutes the subject matter of this application relates to the construction and manufacture of metal wheels, more particularly adapted for use on pleasure and other light vehicles. More specifically the invention has to do with the construction of the hub and its connection not only with the disk members of the wheel, but also with the brake drum and the driving flange, the object being to reduce the cost of manufacture and the weight to a minimum, but having the necessary durability and strength to withstand the various duties and load conditions imposed upon it.

Further objects and advantages of my invention will more fully appear from the detailed description below taken in connection with the accompanying drawings, in which:

Figure 1 is a central sectional view taken in the plane of the axis of rotation of one form of front wheel;

Figure 2 is a side view of the same;

Figures 3 and 4 are views similar to Figs. 1 and 2 of one form of rear wheel.

Referring to Figures 1 and 2 of the drawings, which illustrate the front wheel of the vehicle, the reference numeral 10 designates a tire provided with the usual rim 11, and 12 the felly upon which the tire and its rim are normally mounted. The numerals 13 and 14 designate respectively the outer and inner disks of stampable material, the peripheral portion of each of which is provided with a laterally and inwardly projecting flange, designated respectively by numerals 15 and 16 and to the latter is secured the felly 12, preferably by riveting.

Upon the axle 17 is mounted the hub 18, the interior of which is provided with suitably constructed recesses for suitable bearing means 19, and the exterior of which is provided with integral flanges 20 and 21 preferably arranged at right angles to the axis of the hub suitable bracing members 22 between the flanges being cast integral therewith.

The central portions of the sheet metal disks 13 and 14 are secured to the opposite exterior faces of the flanges 20 and 21 and for the purpose of causing an intimate engagement of the said disks with the said flanges, clamping rings 23 and 24 are employed which are caused to engage the disks by means of the securing bolts 25, suitable holes being provided in the flanges, disks and rings to receive said bolts. In their manufacture the edge around the central perforations in the disks are preferably crimped laterally as indicated at 26 and 27, the flanges 20 and 21 and the rings 23 and 24 being correspondingly shaped, thus providing a most rigid connection between the hub and the disks.

In Figures 3 and 4 is illustrated a three-quarter floating type of wheel for the rear axle which I will now describe in detail. The hub 28 is provided on the interior thereof with a recess for receiving the bearing means 29 and terminates at its outer end in an exterior annular flange 30, and also on the exterior of said hub adjacent the inner end thereof there is provided an integral flange 31. The flanges 30 and 31 correspond to the flanges 20 and 21 illustrated in Figure 1. Rigidly secured to the outer end of the axle 32 is what is commonly known as a driving flange 33, the inner side 34 of which enters the interior space 35 of the hub 28. Telescoping over the interior end 36 of the hub 28 is a brake drum 37, the latter being secured to the flange 31 and the driving flange being secured to the hub flange 30 by means of the securing bolts 38. The flanges 30 and 31 are likewise provided with suitable bracing members 39 cast integral therewith.

Each of the securing bolts 38 in Figures 3 and 4 is provided with screw threads at either end thereof to receive the nuts 40 and 41 and is provided with the beveled enlargement 42 which engages in a counter-sunk recess in the flange 30. Consequently the sheet metal wheel members 13 and 14 and drum 37 can be secured to the hub flanges independently of the driving flange 33 by inserting the bolt through the perforation and applying the nut 40 thereto. The driving flange is then inserted in place and the nut 41 screwed home for securing the same thereto. It will be noted that the driving flange perforations through which the bolts 38 project are large enough to telescope over the enlarged portions 42, thus assuring that the driving flange itself bears directly against the outer face of the metal wheel member 13 and enabling an effective clamping of said member between the flanges 30 and the driving flange 33. It will also be noted that the metal wheel member is provided with stamped portions 43 which fit snugly within the beveled counter-sunk depressions in the flange 30.

The central portion of the disk 13 is clamped between the driving flange 33 and flange 30, there being provided at the center of said disk around the central perforation therein the crimped portion 44 fitting over the bend between the hub and flange 30. The central portion of the disk 14 is clamped between the flange 31 and brake drum 37, said brake drum and flange being so constructed as to receive the crimped portion 45 of the disk.

From the foregoing it will be seen that I have devised a very simple, light, and durable hub and connections between the hub and the sheet metal wheel members. It is obvious, however, that many changes may be made in points of detail and other embodiments resorted to without deviating from the true spirit and scope of my invention as defined by the annexed claims.

Having thus described my invention, what I claim is:

1. In a metal wheel construction, a hub provided with an integral annular flange adjacent its inner end and provided at its outer end with a second annular flange which constitutes a continuation of the body of the hub and which has bevelled perforations therethrough, inner and outer stamped metal wheel forming members engaging respectively with the outer sides of said flanges, the outer members having portions countersunk into said bevelled perforations of said second annular flange, and means for clamping said members to said flanges comprising a brake drum surrounding the inner end of the hub and engaging the outer face of said inner wheel forming member, a driving flange engaging the outer face of said outer wheel member, and a plurality of securing bolts each of which passes through said drum, said members, said flanges and said driving flange, each of said bolts being provided with screw threads at both ends to receive securing nuts and also provided with an intermediate head to engage the countersunk portions of the outer wheel member.

2. In a metal wheel construction, a hub provided with an integral annular flange adjacent its inner end and provided at its outer end with a second annular flange which constitutes a continuation of the body of the hub and which has bevelled perforations therethrough, bracing means formed integral with and connecting said flanges, inner and outer stamped metal wheel forming members engaging respectively with the outer sides of said flanges, the outer member having portions countersunk into said bevelled perforations of said second annular flange, and means for clamping said members to said flanges comprising a brake drum surrounding the inner end of the hub and engaging the outer face of said inner wheel forming member, a driving flange engaging the outer face of the outer wheel member, and a plurality of securing bolts each of which passes through said drum, said members, said flanges and said driving flange, each of said bolts being provided with screw threads at both ends to receive securing nuts and also provided with an intermediate head to engage the countersunk portions of the outer wheel member.

3. In a metal wheel construction, a hub provided with an integral annular flange adjacent its inner end and provided at its outer end with a second annular flange which constitutes a continuation of the barrel of the hub and which has bevelled perforations therethrough, bracing means formed integral with and connecting said flanges, inner and outer stamped metal wheel forming members engaging respectively with the outer sides of said flanges, the outer member having perforated portions countersunk into said bevelled perforations of said second annular flange, and means for clamping said members to said flanges comprising a perforated device surrounding the inner end of the hub and engaging the outer face of said inner wheel forming member, a perforated driving flange engaging the outer face of the outer wheel member, and a plurality of securing bolts each of which passes through the perforations of said device, said members, said flanges and said driving flange, each of said bolts being provided with screw threads at both ends to receive securing nuts and also provided with an intermediate head of less diameter than the perforation in said driving flange to engage the countersunk portions of the outer wheel member and to enable the inner flat surface of said driving flange to engage directly with the outer surface of the outer wheel member.

4. In a metal wheel construction, a hub, provided with an integral perforated annular flange adjacent its inner end and provided at its outer end with a second annular flange which constitutes a continuation of the barrel of the hub and which has bevelled perforations therethrough, inner and outer stamped metal wheel forming members engaging respectively with the outer sides of said flanges, the outer member having perforated portions countersunk into said bevelled perforations of said second annular flange, and means for clamping said members to said flanges comprising a perforated device surrounding the inner end of the hub and engaging the outer face of said inner wheel forming member, a perforated driving flange engaging the outer face of the outer wheel member, a plurality of securing bolts each of which passes through the perforations of said device, said members, said flanges, and said driving flange, said bolts being provided with screw threads at their outer ends to receive securing nuts and also provided with intermediate heads to engage the countersunk portions of the outer wheel members, and nuts mounted upon said screw threads for securing the driving flange in rigid engagement with the outer surface of the outer wheel member.

5. In a metal wheel construction, a hub provided with an integral perforated annular flange adjacent its inner end and provided at its outer end with a second annular flange which constitutes a continuation of the barrel of the hub and which has bevelled perforations therethrough, inner and outer centrally perforated stamped metal wheel forming members engaging respectively with the outer sides of said flanges, the outer member having perforated portions countersunk into said bevelled perforations of said second annular flange, and means for clamping said members to said flanges comprising a perforated device surrounding the inner end of the hub and engaging the outer face of said inner wheel forming member, a perforated driving flange engaging the outer face of the outer wheel member, a plurality of securing bolts each of which passes through the perforations of said device, said members, said flanges, and said driving flange, said bolts being provided with screw threads at their outer ends to receive securing nuts and also provided with intermediate heads of less diameter than the perforations in said driving flange to engage the countersunk portions of the outer wheel members and to enable the inner flat surface of said driving flange to engage directly the outer surface of the outer wheel members, and nuts mounted upon said screw threads for securing the driving flange in rigid engagement with the outer surface of the outer wheel member.

6. In a metal wheel construction, a hub provided with an integral perforated annular flange at its inner end having an inwardly curved fillet and provided at its outer end with a second annular flange which is bent at right angles to and constitutes a continuation of the barrel of the hub, the bent outer portion of said second flange being curved shape, inner and outer centrally perforated stamped wheel forming members engaging respectively with the outer sides of said flanges, the central portion of said inner and outer members being drawn, the former to engage said curved fillet and the barrel of the hub and the latter to engage the curved portion between the barrel and the second annular flange, and means for clamping said members to said flanges comprising a perforated device surrounding the inner end of the hub and engaging the outer face of said inner wheel forming member including the drawn portion thereof, a perforated driving flange engaging the outer face of the outer wheel member, and a plurality of securing bolts each of which passes through the perforations of said device, said members, said flanges and said driving flange.

7. In a metal wheel construction, a hub provided with an integral perforated annular flange at its inner end having an inwardly curved fillet and provided at its outer end with a second annular flange which has bevelled perforations therethrough which is bent at right angles to and constitutes a continuation of the barrel of the hub, the bent outer portions of said second flange being curved shape, inner and outer centrally perforated stamped wheel forming members engaging respectively with the outer sides of said flanges, the central portion of said inner and outer members being drawn, the former to engage said curved fillet and the barrel of the hub and the latter to engage the curved portion between the barrel and the said second annular flange, perforated countersunk portions fitted into said bevelled perforations of said second annular flange, and means for clamping said members to said flanges comprising a perforated device surrounding the inner end of the hub and engaging the outer face of said inner wheel forming member including the drawn portion thereof, a perforated driving flange engaging the outer face of the outer wheel member, and a plurality of securing bolts each of which passes through the perforations of said device, said members, said flanges and said driving flange, said bolts being provided with screw threads at both ends thereof to receive securing nuts and also provided with intermediate heads to engage the countersunk portions of the outer wheel member.

8. In a metal wheel construction, a hub provided with an integral perforated annular flange at its inner end having an inwardly curved fillet and provided at its outer end with a second annular flange which has bevelled perforations therethrough, and which is bent at right angles to and constitutes a continuation of the barrel of the hub, the bent outer portion of said second flange being of curved edge, inner and outer centrally perforated stamped wheel forming members engaging respectively with the outer sides of said flanges, the central portion of said inner and outer members being drawn, the former to engage said curved fillet and the barrel of the hub and the latter to engage the curved portion between the barrel and the said second annular flange, perforated countersunk portions fitted into said bevelled perforations of said second annular flange, and means for clamping said members to said flanges comprising a perforated device surrounding the inner end of the hub and engaging the outer face of said inner wheel forming member including the drawn portion thereof, a perforated driving flange engaging the outer face of the outer wheel member, and a plurality of securing bolts each of which passes through the perforations of said device, said members, said flanges and said driving flange, said bolts being provided with screw threads at both ends to receive securing nuts and also provided with intermediate heads of less diameter than the perforations in said driving flange to engage the countersunk portions of the outer wheel member and to enable the inner flat surface of said driving flange to engage directly with the outer surface of the outer wheel member.

9. In a metal wheel construction, a hub provided with an integral perforated annular flange at its inner end and provided at its outer end with a second annular flange which constitutes a continuation of the barrel of the hub and which has bevelled perforations therethrough, inner and outer stamped metal wheel forming members engaging respectively with the outer sides of said flanges, the outer member having perforated portions countersunk into said bevelled perforations of said second annular flange, and means for clamping said members to said flanges into a unitary structure comprising a perforated device surrounding and fitting the inner end of the hub and engaging the outer face of said inner wheel forming member, a plurality of securing bolts each of which passes through the perforations of said device, said members and said flanges, said bolts being provided with screw threads at their respective end to receive securing nuts and also provided with intermediate heads to engage the countersunk portions of the outer wheel members, and nuts mounted upon the screw threads at the inner ends of said bolts for securing said members, said flanges and said device in rigid engagement with each other, a driving flange provided with perforations to receive the outer ends of said bolts and nuts for engaging the outer ends of said bolts to clamp said driving flange to said unitary structure, said flange being located between the said intermediate heads and the last mentioned nuts.

10. In a metal wheel construction, a hub provided with an integral flange adjacent its inner end and terminating at its outer end in a second annular flange, inner and outer stamped metal wheel forming members provided with perforated drawn centers and engaging respectively with the outer sides of said flanges, and means for clamping said members to said flanges comprising a brake drum surrounding and fitting the hub and engaging the outer face of said inner wheel member including the drawn center thereof, a driving flange engaging the outer face of the outer wheel member, and plurality of securing bolts each of which passes through said drum, said members, said flanges and said driving flange.

In testimony whereof, I have hereunto set my hand this 21st day of February, 1921.

ALFRED M. LOFLAND.